United States Patent Office 3,634,517
Patented Jan. 11, 1972

3,634,517
TRIARYLALKENONES
Frank P. Palopoli, Glenside, Pa., and Harvey D. Benson, Cincinnati, Ohio, assignors to Richardson-Merrell Inc., New York, N.Y.
No Drawing. Filed Aug. 19, 1968, Ser. No. 753,741
Int. Cl. C07c 49/76
U.S. Cl. 260—590
14 Claims

ABSTRACT OF THE DISCLOSURE

Compounds of the formula:

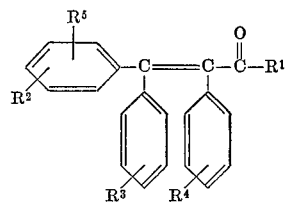

wherein $R^1$ is lower alkyl; each of $R^2$, $R^3$ and $R^4$ is hydrogen, lower alkyl, halogen, hydroxy, lower alkoxy, diloweralkylaminoloweralkoxy or trifluoromethyl; and $R^5$ is hydrogen, lower alkyl, or diloweralkylaminomethyl, provided that when $R^5$ is diloweralkylaminomethyl $R^2$ is hydroxy in the para-position of said benzene ring and the diloweralkylaminomethyl is ortho to said hydroxy group; and pharmacologically acceptable, non-toxic acid addition salts of the basic compounds. These compounds possess estrogenic, anti-estrogenic and antiinflammatory activities.

---

This invention relates to novel physiologically active triarylalkenones and to a process for their manufacture.

The novel triarylalkenones of this invention can be represented by the formula:

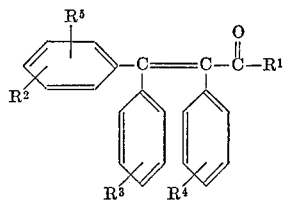

wherein $R^1$ is lower alkyl; each of $R^2$, $R^3$ and $R^4$ is hydrogen, lower alkyl, halogen, hydroxy, lower alkoxy, diloweralkylaminolower alkoxy or trifluoromethyl; and $R^5$ is hydrogen, lower alkyl, or diloweralkylaminomethyl, provided that when $R^5$ is diloweralkylaminomethyl $R^2$ is hydroxy in the para-position of said benzene ring and the diloweralkylaminomethyl is ortho to said hydroxy group.

Many of the compounds of this invention are unsymmetrical ethylenes and as such are capable of existing as cis or trans geometric isomers. It should be understood that this invention relates to the separate geometric isomers as well as to mixtures of such isomers.

The term "lower" as used herein to describe alkyl relates to such a group having from 1 to 4 carbon atoms and preferably 1 to 2 carbon atoms. Illustrative of lower alkyl there can be mentioned: methyl, ethyl, propyl, isopropyl and butyl. Illustrative of lower alkoxy there can be mentioned: methoxy, ethoxy, and butoxy. Illustrative of diloweralkylaminomethyl there can be mentioned: dimethylaminomethyl, diethylaminomethyl, and dibutylaminomethyl. Illustrative of diloweralkylaminoloweralkoxy there can be mentioned; diethylaminoethoxy; dimethylaminopropoxy; and the like. Illustrative of halogens there can be mentioned chlorine, bromine and fluorine, but preferably chlorine.

Salts of the novel basic compounds, i.e., compounds having an amino group, of this invention are particularly pharmacologically acceptable, non-toxic acid addition salts, such as those with inorganic acids, e.g., hydrochloric, hydrobromic, sulfuric, phosphoric acids and the like, with organic carboxylic acids, e.g., acetic, propionic, glycolic, lactic, pyruvic, oxalic, malonic, succinic, fumaric, malic, tartaric, citric, ascorbic, maleic, hydroxymaleic, dihydroxymaleic, fumaric, benzoic, phenylacetic, 4-aminobenzoic, 4-hydroxybenzoic, anthranilic, cinnamic, mandelic, salicylic, 4-aminosalicylic, 2-phenoxybenzoic, 2-acetoxybenzoic acid and the like, or organic sulfonic acids, e.g., methane sulfonic, ethane sulfonic, 2-hydroxyethane sulfonic, p-toluene sulfonic acid and the like. Neutral or acid salts may be formed.

The novel compounds of this invention (including acid addition salts thereof) have anti-inflammatory activity and endocrine activity such as estrogenic and anti-estrogenic activity. Estrogenic activity was demonstrated by an increase in the uterus weight of female animals, e.g., mammals such as mice, after administration of a novel compound of this invention when such animals were compared with untreated controls. The anti-estrogenic activity was evidenced by a greater uterine weight in mammals such as mice or rats treated with a conventional estrogen as compared to similar animals treated with such estrogen and a novel compound of this invention. Anti-inflammatory action was demonstrated by one or more of the following tests in mammals such as mice or rats by inhibition of inflammatory edema formation, inhibition of granuloma formation in the anti-fibrosis test, or inhibition of the PMN infiltration in the PMN infiltration test.

The novel compounds of this invention can be used as medicaments in the form of pharmaceutical preparations which contain the novel compounds in admixture with a pharmaceutical organic or inorganic solid or liquid carrier suitable for enteral, e.g., oral, or parenteral, e.g., subcutaneous, administration. The pharmaceutical preparations can be in solid form, e.g., tablets or capsules or in liquid form, for example, in solutions, suspensions or emulsions. The quantity of novel compound medicament in the unit dosage can vary over a wide range, for example, from about 30 to 300 mg., depending on the mode of administration and the animal being treated. The quantity of drug administered per dosage can vary over a wide range such as that of from less than about 0.3 to over 250 mg. per kg. of animal weight, in the case of estrogenic or anti-estrogenic use. Preferably, the dosage will range from about 1 to 20 mg. per kg. of animal weight for the estrogenic or anti-estrogenic use. In the case of anti-inflammatory use the dosages can vary from less than about 0.3 to 300 mg. per kg. of animal weight and preferably from about 1 to 20 mg. per kg. of animal weight. Illustratively, estrogenic and anti-estrogenic activities can be obtained after subcutaneous injection in mice of one dose ranging from 0.03 to 300 mg. per kg. of animal weight when administered to female mice. Anti-inflammatory activity can be evidenced after oral administration of 3 to 100 milligrams (mg.) per kilogram (kg.) of animal weight, as little as 0.3 mg. per kg. of animal weight subcutaneously, and 3 to 30 mg. per kg. when applied topically. As anti-inflammatory agents, the compounds can be useful in alleviating symptoms of collagen diseases and in the topical treatment of inflammation.

The novel compounds of this invention can be prepared by a number of routes. Illustratively, they can be prepared by reacting an organometallic reagent, such as lower alkyllithium, e.g., methyllithium, with a triaryl acrylonitrile and subsequently hydrolyzing the imine which is formed by the use of an aqueous acid medium. This generic reaction can be illustrated as follows:

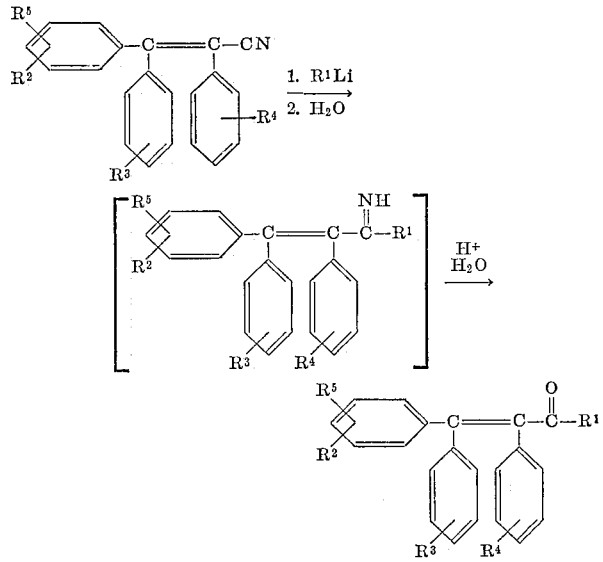

wherein each of $R^1$, $R^2$, $R^3$, $R^4$ and $R^5$ have the same meanings given hereinbefore. The imine intermediate can be isolated prior to hydrolysis or it may be converted to the triarylalkenone without prior isolation. When a substituent on the aryl groups is hydroxy, the pyranoxy blocking group can be formed by conventional techniques in order to block the hydroxyl in the reaction. In the hydrolysis of the imine, the pyranoxy group is converted back to the hydroxy.

The diloweralkylaminoloweralkoxy derivatives of the triarylalkenones of this invention can also be prepared by reacting the appropriate hydroxy-substituted triarylalkenone with a diloweralkylaminoloweralkyl halide in an alkaline medium as shown by the following formulae:

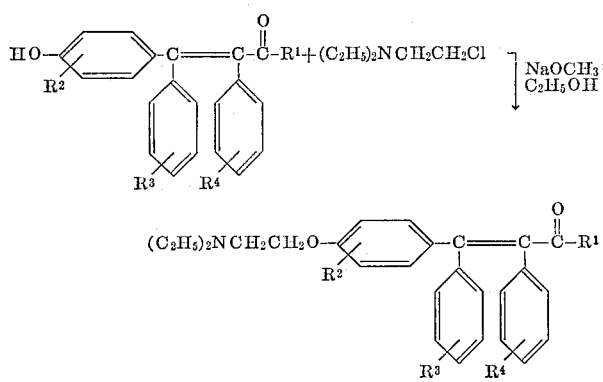

wherein each of $R^2$, $R^3$, $R^4$ and $R^1$ have the meaning given hereinabove.

Also, by reacting the appropriate hydroxy-substituted triarylalkenone with formaldehyde and a secondary amine in refluxing ethanol, a diloweralkylaminomethyl group can be inserted ortho to the hydroxy group as shown in the following formulae:

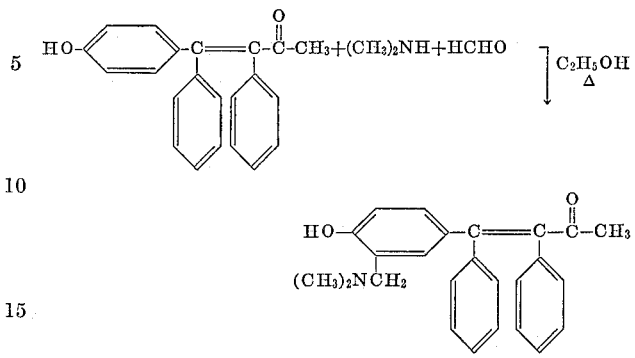

The triarylacrylonitrile reactants are for the most part known compounds. Those not specifically disclosed in the literature can be prepared by conventional techniques disclosed for the known compounds such as the following techniques:

(a) Base catalyzed condensation of a phenylacetonitrile and a benzophenone;

(b) Reaction of a triarylhaloethylene with cuprous cyanide; or (c) Formation of a phenolic hydroxy group on an existing triarylacrylonitrile by cleavage of the corresponding methoxy derivative with pyridine hydrochloride.

The following examples are illustrative of the invention.

EXAMPLE 1

Preparation of 3,4-diphenyl-4-(p-methoxyphenyl)-3-buten-2-one

Methyl lithium, prepared from 14.1 g. (0.1 mole) of methyl iodide and 1.75 g. of lithium wire in ether was added to 10 g. (0.033 mole) of 2,3-diphenyl-3-(p-methoxyphenyl)acrylonitrile suspended in ether. The reaction was stirred until the nitrile had dissolved and then it was refluxed for one hour. The reaction was poured onto ice and the ether layer collected. The imine intermediate was extracted from the ether with 10% hydrochloric acid. The acid layer was then made basic with 10% NaOH and the free base of the imino compound taken up in ether. The hydrochloride salt of the imino compound was prepared by the addition of ethereal hydrochloric acid. The ether was decanted and the residue dissolved in water and heated on the steam bath for two hours to hydrolyze the imino compound. The oil which separated was dissolved in methylene chloride and dried, and the solvent was then removed by evaporation on a steam bath. The residue was chromatographed on a column of alumina using methylene chloride for elution. The product was crystallized from ethanol and petroleum ether (B.P. 40–60° C.) yielding a mixture of cis-trans isomers of 3,4-diphenyl-4-(p-methoxyphenyl)-3-buten-2-one which melted at 100–108° C. This compound exhibits estrogenic, anti-estrogenic, and anti-inflammatory activities.

EXAMPLE 2

Preparation of 3,4-diphenyl-4-(p-hydroxyphenyl)-3-buten-2-one

Methyl lithium prepared from 14.1 g. (0.1 mole) of methyl iodide and 2 g. of lithium wire was added to 10 g. (0.034 mole) of 2,3 - diphenyl - 3-(p-hydroxyphenyl) acrylonitrile suspended in ether. Tetrahydrofuran (400 ml.) was added and the solution was refluxed for 2 hours. The reaction was then poured onto ice and the water layer was collected. The water layer was made acidic with 10% hydrochloric acid and heated on the steam bath for three hours to hydrolyze the imino intermediate. The product separated as a solid. Recrystallization first from ethanol and water and then from benzene and petroleum ether (B.P. 40–60° C.) gave 3,4-diphenyl-4-(p-hydroxyphenyl)-3-buten-2-one which melted at 203–207° C. This compound exhibits estrogenic and anti-estrogenic activities.

EXAMPLE 3

Preparation of 3,4-diphenyl-4-(p-tolyl)-3-buten-2-one

When the 2,3,3 - triphenylacrylonitrile in the following Example 4 was replaced with 2,3-diphenyl-3-(p-tolyl)acrylonitrile there was obtained a mixture of the cis-trans isomers of 3,4-diphenyl-4-(p-tolyl)-3-buten-2-one which melted at 112–120° C. This compound exhibits estrogenic and anti-estrogenic activities.

EXAMPLE 4

Preparation of 3,4,4-triphenyl-3-buten-2-one

Methyl lithium, prepared from 14.1 g. (0.1 mole) of methyl iodide and 1.5 g. of lithium wire in ether, was added to 10 g. (0.036 mole) of 2,3,3-triphenylacrylonitrile suspended in ether. The reaction was refluxed for three hours, cooled and poured onto ice. The ether layer was collected and the imine intermediate was extracted from the ether with 10% hydrochloric acid. Heating the acid extract on the steam bath with stirring for three hours resulted in the hydrolysis of the imino compound, and the separation of the product as a solid, which was collected by filtration. This material was dissolved in methylene chloride, dried over magnesium sulfate, treated with charcoal and filtered. The solvent was then removed by evaporation on the steam bath. The solid residue was recrystallized first from petroleum ether (B.P. 75–90° C.) and then from ethanol to give the desired 3,4,4-triphenyl-3-buten-2-one as a white crystalline solid which melted at 149–152° C. This compound exhibits estrogenic and anti-estrogenic activities.

EXAMPLE 5

Preparation of 4-(p-chlorophenyl)-3,4-diphenyl-3-buten-2-one

When the 2,3,3-triphenylacrylonitrile in Example 4 was replaced with 3-(p-chlorophenyl)-2,3-diphenylacrylonitrile there was obtained a mixture of the cis-trans isomers of 4-(p-chlorophenyl)-3,4-diphenyl-3-buten-2-one which melted at 110–123° C. This compound exhibits estrogenic and anti-inflammatory activities.

EXAMPLE 6

Preparation of 4-(m-chlorophenyl)-3,4-diphenyl-3-buten-2-one

When the 2,3,3-triphenylacrylonitrile in Example 4 was replaced with 3-(m-chlorophenyl)-2,3-diphenylacrylonitrile there was obtained a mixture of the cis trans isomers of 4-(m-chlorophenyl)-3,4-diphenyl-3-buten-2-one which melted at 105–138° C. Recrystallization of 4-(m-chlorophenyl)-3,4-diphenyl-3-buten-2-one from cyclohexane yielded the higher melting isomer of 4-(m-chlorophenyl)-3,4-diphenyl-3-buten-2-one which melted at 145–147° C. Concentration of the mother liquor yielded the lower melting isomer of 4-(m-chlorophenyl)-3,4-diphenyl-3-buten-2-one which melted at 112–115° C. The subject compound exhibits estrogenic, anti-estrogenic, and anti-inflammatory activities.

EXAMPLE 7

Preparation of 4,4-bis(m-chlorophenyl)-3-phenyl-3-buten-2-one

When the 2,3,3-triphenylacrylonitrile in Example 4 was replaced with 3,3 - bis(m-chlorophenyl)-2-phenylacrylonitrile, there was obtained 4,4-bis(m-chlorophenyl)-3-phenyl-3-buten-2-one which melted at 124–127° C. This compound exhibits anti-estrogenic activity.

EXAMPLE 8

Preparation of 3,4-diphenyl-4-[p-($\beta$-diethylaminoethoxy)phenyl]-3-buten-2-one A solution of 5 g. (0.016 mole) of 3,4-diphenyl-4-(p-hydroxyphenyl)-3-buten-2-one, 0.85 g. (0.016 mole) of sodium methoxide, and 2.15 g. (0.016 mole) of $\beta$-diethylaminoethyl chloride in 150 ml. of ethanol were allowed to stand at room temperature for 55 hours. The solvent was removed on the steam bath under reduced pressure, and the residue dissolved in ether and extracted with water. The ether layer was dried and filtered. Alcoholic hydrochloric acid was added and the oil which separated was crystallized from ethyl acetate yielding 3,4-diphenyl-4-[p-($\beta$-diethylaminoethoxy)-phenyl]-3-buten-2-one hydrochloride which melted at 188–190° C. This compound exhibits estrogenic, anti-estrogenic, and anti-inflammatory activities.

EXAMPLE 9

Preparation of 4 - [4-hydroxy-3-(dimethylaminomethyl)phenyl]-3,4-diphenyl-3-buten-2-one A solution of 5 g. (0.016 mole) of 3,4-diphenyl-4-(p-hydroxyphenyl)-3-buten-2-one, 5.89 g. (0.033 mole) of a 25% aqueous dimethylamine solution and 2.6 g. (0.032 mole) of Formalin (37%) in 75 ml. of ethanol was refluxed for two hours. The solvent was removed under reduced pressure and the residue was dissolved in ether, and treated with a minimum amount of ethereal hydrochloric acid. The resulting solid was recrystallized from a methanol-butanone mixture yielding the hydrochloride salt of 4-[4-hydroxy-3-(dimethylaminomethyl)phenyl]-3,4-diphenyl-3-buten-2-one which melted at 209–211° C. This compound exhibits anti-estrogenic activity.

EXAMPLE 10

Preparation of 3,4-diphenyl-4-(m-tolyl)-3-buten-2-one

When the 2,3,3-triphenylacrylonitrile in Example 4 was replaced with 2,3-diphenyl-3-(m-tolyl)acrylonitrile, a mixture of the cis-trans isomers of 3,4-diphenyl-4-(m-tolyl)-3-buten-2-one was obtained which melted at 108–138° C.

Recrystallization of 3,4-diphenyl-4-(m-tolyl)-3-buten-2-one from ethyl acetate gave the higher melting isomer of 3,4-diphenyl-4-(m-tolyl)-3-buten-2-one which melted at 136–143° C. The lower melting isomer was obtained from the mother liquor by removing the solvent and recrystallizing the residue from ether to yield the product which melted at 117–124° C. The subject compound exhibits anti-estrogenic activity.

EXAMPLE 11

Preparation of 3,4-diphenyl-4-(m-methoxyphenyl)-3-buten-2-one

When the 2,3,3-triphenylacrylonitrile in Example 4 was replaced with 2,3-diphenyl-3-(m-methoxyphenyl)acrylonitrile, there was obtained 3,4-diphenyl-4-(m-methoxyphenyl)-3-buten-2-one which melted at 116–149° C. as a mixture of cis-trans isomers. This compound exhibits estrogenic and anti-estrogenic activities.

EXAMPLE 12

Preparation of 3,4-diphenyl-4-(m-trifluoromethylphenyl)-3-buten-2-one

When the 2,3,3-triphenylacrylonitrile in Example 4 was replaced with 2,3-diphenyl-3-(m-trifluoromethylphenyl)acrylonitrile, there was obtained 3,4-diphenyl-4-(m-trifluoromethylphenyl)-3-buten-2-one which melted at 105–109° C. This compound exhibits anti-estrogenic activity.

EXAMPLE 13

Preparation of 3,4-diphenyl-4-(m-hydroxyphenyl)-3-buten-2-one

When the 2,3-diphenyl-3-(p-hydroxyphenyl)acrylonitrile in Example 2 was replaced with 2,3-diphenyl-3-(m-hydroxyphenyl)acrylonitrile, using ether as the only solvent, there was obtained 3,4-diphenyl-4-(m-hydroxyphenyl)-3-buten-2-one which melted at 175–177° C. This compound exhibits estrogenic, anti-estrogenic, and anti-inflammatory activities.

EXAMPLE 14

Preparation of 3,4-diphenyl-4-[m-(β-diethylaminoethoxy)phenyl]-3-buten-2-one

A mixture of 3.75 g. (0.012 mole) of 3,4-diphenyl-4-m-hydroxyphenyl)-3-buten-2-one, 0.48 g. (0.012 mole) of sodium hydroxide and 1.63 g. (0.012 mole) of β-diethylaminoethyl chloride in water was treated with ethanol to effect solution. This solution was stirred at room temperature for 24 hours, warmed on the steam bath for 30 minutes and then cooled. The solid which separated was collected and recrystallized from petroleum ether (B.P. 40–60° C.) yielding 3,4-diphenyl-4-[m-(β-diethylaminoethoxy)phenyl]-3-buten-2-one, which melted at 71–73° C. This compound exhibits estrogenic, anti-estrogenic, and anti-inflammatory activities.

EXAMPLE 15

Preparation of 4,4-diphenyl-3-(m-methoxyphenyl)-3-buten-2-one

When the 2,3,3-triphenylacrylonitrile in Example 4 was replaced with 3,3-diphenyl-2-(m-methoxyphenyl)acrylonitrile, there was obtained 4,4-diphenyl-3-(m-methoxyphenyl)-3-buten-2-one which melted at 102–105° C. This compound exhibits estrogenic and anti-estrogenic activities.

EXAMPLE 16

Preparation of 4,4-diphenyl-3-(m-hydroxyphenyl)-3-buten-2-one

When the 2,3-diphenyl-3-(p-hydroxyphenyl)acrylonitrile in Example 2 was replaced with 3,3-diphenyl-(m-hydroxyphenyl)acrylonitrile, using ether as the only solvent, there was obtained 4,4-diphenyl-3-(m-hydroxyphenyl)-3-buten-2-one which melted at 139–141° C. This compound exhibits estrogenic and anti-estrogenic activities.

EXAMPLE 17

Preparation of 4,4-diphenyl-3-[m-(β-diethylaminoethoxy)phenyl]-3-buten-2-one

A solution of 6.5 g. (0.02 mole) of 4,4-diphenyl-3-(m-hydroxyphenyl)-3-buten-2-one and 0.9 g. (0.022 mole) of sodium hydroxide was made in water and alcohol, and 3 g. (0.022 mole) of β-diethylaminoethyl chloride was added. The reaction was refluxed for 1 hour and allowed to stand for 64 hours. Water was added and the semi-solid which separated was collected and dissolved in methylene chloride and dried over magnesium sulfate and the solvent was removed by evaporation on a steam bath. The residue was converted to the citrate salt yielding 4,4-diphenyl-3-[m - (β - diethylaminoethoxy)phenyl] - 3 - buten - 2-one dihydrogen citrate which melted at 98–103° C. with decomposition. This compound exhibits estrogenic and anti-estrogenic activities.

EXAMPLE 18

Preparation of 3,4-diphenyl-4-(m-fluorophenyl)-3-buten-2-one

When the 2,3,3-triphenylacrylonitrile in Example 4 was replaced with 2,3-diphenyl-3-(m-fluorophenyl)acrylonitrile there was obtained a mixture of the cis-trans isomers of 3,4-diphenyl-4-(m-fluorophenyl)-3-buten-2-one which melted at 118–130° C. Recrystallization from cyclohexane yielded the higher melting isomer of 3,4-diphenyl-4-(m-fluorophenyl)-3-buten-2-one which melted at 140–142° C. The residue, from evaporation of the mother liquor, after crystallization from petroleum ether (B.P. 75–90° C.) gave the lower melting isomer of 3,4-diphenyl-4-(m-fluorophenyl)-3-buten-2-one which melted at 105–107° C. The subject compound exhibits estrogenic and anti-estrogenic activities.

EXAMPLE 19

Preparation of 3-(m-chlorophenyl)-4,4-diphenyl-3-buten-2-one

When the 2,3,3-triphenylacrylonitrile in Example 4 was replaced with 2-(m-chlorophenyl)-3,3-diphenylacrylonitrile, there was obtained 3-(m-chlorophenyl)-4,4-diphenyl-3-buten-2-one which melted at 135–138° C. This compound exhibits estrogenic and anti-estrogenic activities.

EXAMPLE 20

Preparation of 3-(p-chlorophenyl)-4,4-diphenyl-3-buten-2-one

When the 2,3,3-triphenylacrylonitrile in Example 4 was replaced with 2-(p-chlorophenyl)-3,3-diphenylacrylonitrile, there was obtained 3-(p-chlorophenyl)-4,4-diphenyl-3-buten-2-one which melted at 104–105° C. This compound exhibits estrogenic and anti-estrogenic activities.

EXAMPLE 21

Preparation of 3-(o-chlorophenyl)-4,4-diphenyl-3-buten-2-one

When the 2,3,3-triphenylacrylonitrile in Example 4 was replaced with 2-(o-chlorophenyl)-3,3-diphenylacrylonitrile, there was obtained 3-(o-chlorophenyl)-4,4-diphenyl-3-buten-2-one which melted at 150–152° C. This compound exhibits estrogenic and anti-estrogenic activities.

EXAMPLE 22

Preparation of 4,4-diphenyl-3-(m-fluorophenyl)-3-buten-2-one

When the 2,3,3-triphenylacrylonitrile in Example 4 was replaced with 3,3-diphenyl-2-(m-fluorophenyl)acrylonitrile, there was obtained 4,4-diphenyl-3-(m-fluorophenyl)-3-buten-2-one which melted at 125–127° C. This compound exhibits estrogenic and anti-estrogenic activities.

EXAMPLE 23

Preparation of 4-(3,4-dimethylphenyl)-3,4-diphenyl-3-buten-2-one

When the 2,3,3-triphenylacrylonitrile in Example 4 was replaced with 3-(3,4-dimethylphenyl)-3,4-diphenylacrylonitrile, there was obtained a mixture of cis-trans isomers which melted at 130–143° C. Recrystallization from petroleum ether (75–90° C.)-benzene yielded the high melting isomer of 4-(3,4-dimethylphenyl)-3,4-diphenyl-3-buten-2-one which melted at 142–144° C. The residue from the mother liquor was crystallized from petroleum ether (75–90° C.) to give the low melting isomer of 4-(3,4-dimethylphenyl)-3,4-diphenyl-3-buten-2-one which melted at 133.0–135.5° C. The subject compound exhibits estrogenic activity.

EXAMPLE 24

Preparation of 1,1,2-triphenyl-1-hepten-3-one

When the methyl lithium in Example 4 was replaced with n-butyl lithium, there was obtained 1,1,2-triphenyl-1-hepten-3-one which melted at 115–116° C. This compound exhibits estrogenic and anti-estrogenic activities.

EXAMPLE 25

Preparation of 3,4,4-tris(p-methoxyphenyl)-3-buten-2-one

When the 2,3,3-triphenylacrylonitrile in Example 4 was replaced with 2,3,3 - tris(p - methoxyphenyl)acrylonitrile there was obtained 3,4,4-tris(p-methoxyphenyl)-3-buten-3-one which melted at 116.0–117.5° C. This compound exhibits estrogenic activity.

EXAMPLE 26

Preparation of 4,4-bis(p-methoxyphenyl)-3-(o-chlorophenyl)-3-buten-2-one

When the 2,3,3-triphenylacrylonitrile in Example 4 was replaced with 3,3-bis(p-methoxyphenyl) - 2 - (o-chlorophenyl)acrylonitrile there was obtained 4,4-bis(p-methoxyphenyl) - 3 - (o-chlorophenyl)-3-buten-2-one which melted at 134–136° C. This compound exhibits estrogenic, anti-estrogenic, and anti-inflammatory activities.

EXAMPLE 27

Preparation of 4,4-bis(p-hydroxyphenyl)-3-(o-chlorophenyl)-3-buten-2-one

When the 2,3,3-triphenylacrylonitrile in Example 4 was replaced with 3,3-bis(p-pyranoxyphenyl) - 2 - (o-chlorophenyl)acrylonitrile there was obtained 4,4-bis(p-hydroxyphenyl) - 3 - (o-chlorophenyl)-3-buten-2-one which melted at 235–237° C. This compound exhibits estrogenic and anti-estrogenic activities.

EXAMPLE 28

Preparation of 4,4-bis[p-(β-diethylaminoethoxy)phenyl] 3-(o-chlorophenyl)-3-buten-2-one A solution of 15 g. (0.041 mole of 4,4-bis(p-hydroxyphenyl)-3-(o-chlorophenyl) - 3 - buten-2-one and 4.86 g. (0.09 mole) of sodium methoxide in ethanol was refluxed for 5 minutes. A 12.2 g. (0.09 mole) quantity of β-diethylaminoethyl chloride was added and refluxing was continued for 3 hours. The solvent was removed under reduced pressure, and the residue was dissolved in ether and extracted with 10% aqueous sodium hydroxide. The ether layer was dried and filtered. The solvent was removed on the steam bath. The residue was converted to the bis citrate salt yielding 4,4-bis[p-(β-diethylaminoethoxy)phenyl]-3-(o-chlorophenyl) - 3 - buten-2-one bis dihydrogen citrate monohydrate which decomposed at 95–98° C. This compound exhibits estrogenic and anti-estrogenic activities.

EXAMPLE 29

Preparation of 4-(p-hydroxyphenyl)-3-(p-methoxyphenyl)-4-phenyl-3-buten-2-one

When the 2,3-diphenyl - 3 - (p-hydroxyphenyl)acrylonitrile in Example 2 was replaced with 3-(p-hydroxyphenyl)-2-(p-methoxyphenyl) - 3 - phenylacrylonitrile there was obtained a mixture of the cis and trans isomers of 4-(p-hydroxyphenyl)-3-(p-methoxyphenyl)-4-phenyl-3-buten-2-one which melted at 185–190° C. This compound exhibits estrogenic and anti-estrogenic activities.

EXAMPLE 30

Preparation of 4-[p-(β-diethylaminoethoxy)phenyl]-3-(p-mehtoxyphenyl)-4-phenyl-3-buten-2-one A solution of 9 g. (0.029 mole) of 4-(p-hydroxyphenyl) - 3 - (p-methoxyphenyl)-4-phenyl-3-buten-2-one and 1.62 g. (0.03 mole) of sodium methoxide in ethanol was refluxed for 5 minutes. A 4.05 g. (0.03 mole) quantity of β-diethylaminoethyl chloride was added and refluxing was continued for four hours. The solvent was removed under reduced pressure. The residue was dissolved in ether and extracted first with 10% aqueous sodium hydroxide and then with water. The ether was dried over magnesium sulfate, and filtered, and the solvent was removed on the steam bath. The residue was converted to the citrate salt yielding 4-[p-(β-diethylaminoethoxy) phenyl]-3-(p-methoxyphenyl) - 3 - buten-2-one which decomposed at 95–100° C. This compound exhibits estrogenic and anti-estrogenic activities.

What is claimed is:
1. The compound of the formula

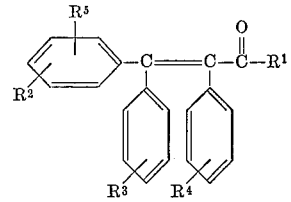

wherein: $R^1$ is lower alkyl; each of $R^2$, $R^3$ and $R^4$ is hydrogen, lower alkyl, halogen, hydroxy, lower alkoxy, or trifluoromethyl; and $R^5$ is hydrogen or lower alkyl.

2. A compound of claim 1 wherein $R^2$ is methoxy in the para-position, each of $R^5$, $R^3$ and $R^4$ is hydrogen, and $R^1$ is methyl.

3. A compound of claim 1 wherein $R^2$ is methoxy in the meta-position, each of $R^5$, $R^3$ and $R^4$ is hydrogen, and $R^1$ is methyl.

4. A compound of claim 1 wherein each of $R^5$, $R^2$ and $R^3$ is hydrogen, $R^4$ is methoxy in the meta-position, and $R^1$ is methyl.

5. A compound of claim 1 wherein each of $R^2$ and $R^3$ is methoxy in the para-position, $R^5$ is hydrogen, $R^4$ is chlorine in the ortho-position, and $R^1$ is methyl.

6. A compound of claim 1 wherein each of $R^5$, $R^2$, $R^3$ and $R^4$ is hydrogen, and $R^1$ is methyl.

7. A compound of claim 1 wherein each of $R^2$, $R^3$ and $R^4$ is methoxy in the para-position, $R^5$ is hydrogen, and $R^1$ is methyl.

8. A compound of claim 1 wherein $R^2$ is hydroxy in the para-position, each of $R^5$, $R^3$ and $R^4$ is hydrogen, and $R^1$ is methyl.

9. A compound of claim 1 wherein $R^2$ is chlorine in the para-position, each of $R^5$, $R^3$ and $R^4$ is hydrogen, and $R^1$ is methyl.

10. A compound of claim 1 wherein each of $R^2$ and $R^3$ is chlorine in the meta-position, each of $R^5$ and $R^4$ is hydrogen, and $R^1$ is methyl.

11. A compound of claim 1 wherein $R^2$ is chlorine in the meta-position, each of $R^5$, $R^3$ and $R^4$ is hydrogen, and $R^1$ is methyl.

12. A compound of claim 1 wherein each of $R^5$, $R^2$ and $R^3$ is hydrogen, $R^4$ is chlorine in the ortho-position, and $R^1$ is methyl.

13. A compound of claim 1 wherein $R^2$ is hydroxy in the para-position, $R^4$ is methoxy in the para-position, each of $R^3$ and $R^5$ is hydrogen, and $R^1$ is methyl.

14. A compound of claim 1 wherein each of $R^5$, $R^2$, $R^3$ and $R^4$ is hydrogen, and $R^1$ is butyl.

References Cited

UNITED STATES PATENTS

| | | | |
|---|---|---|---|
| 2,836,623 | 5/1958 | Rong | 260—590 |
| 3,030,359 | 4/1962 | Arens | 260—239.55 |
| 3,059,032 | 10/1962 | Normant | 260—590 |
| 3,365,481 | 1/1968 | Wittig et al. | 260—590 X |

ROBERT V. HINES, Primary Examiner

U.S. Cl. X.R.

260—343.7, 345.7, 465 E, F, G, K, 501.11, 501.18, 501.19, 566 R, 570 R; 424—330, 331